R. STRESAU.
APPARATUS FOR ELECTRIC WELDING.
APPLICATION FILED JULY 17, 1920.
1,407,900.
Patented Feb. 28, 1922.
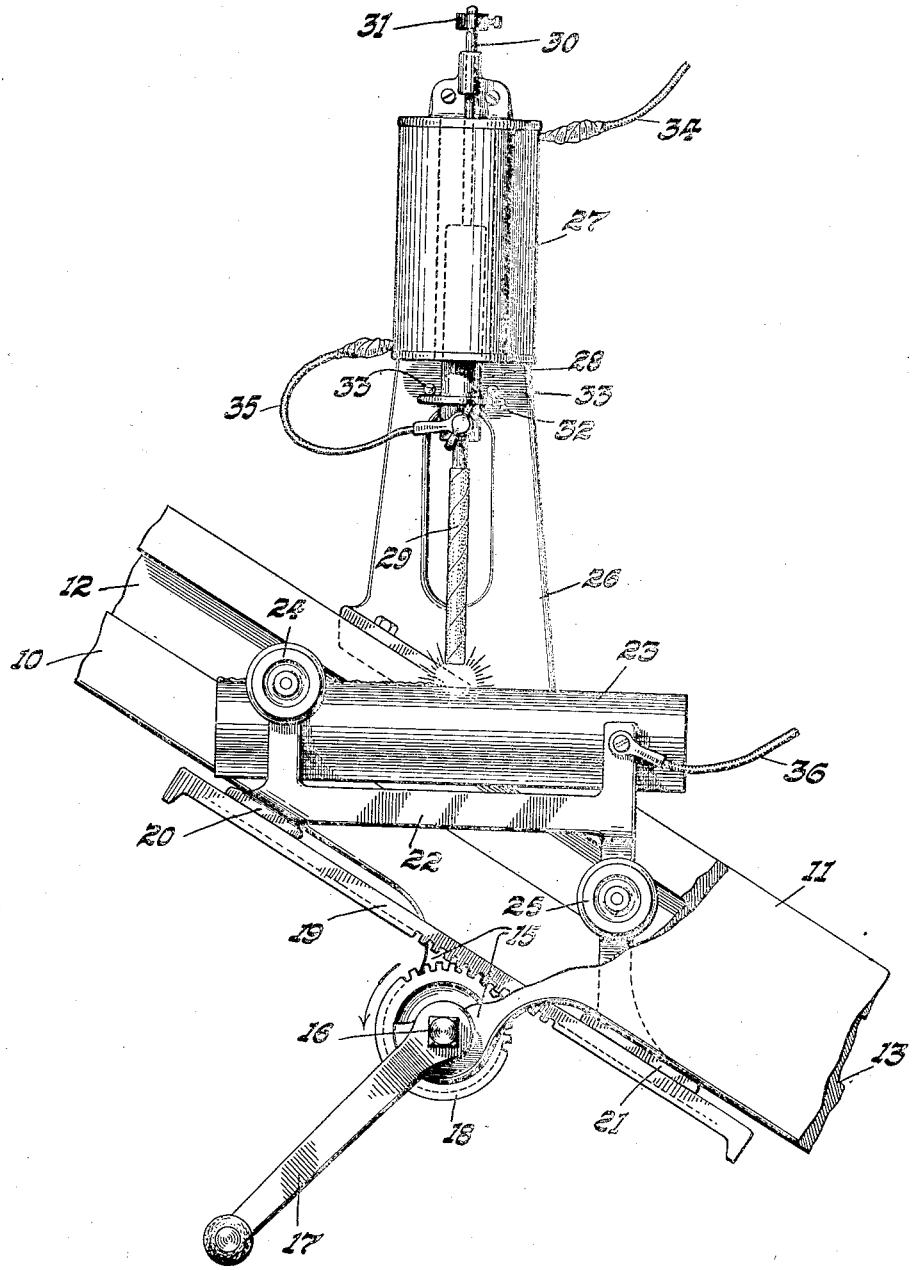
WITNESS
INVENTOR
Richard Stresau
BY
ATTORNEYS

UNITED STATES PATENT OFFICE.

RICHARD STRESAU, OF WAUWATOSA, WISCONSIN, ASSIGNOR TO A. O. SMITH CORPORATION, OF MILWAUKEE, WISCONSIN, A CORPORATION OF NEW YORK.

APPARATUS FOR ELECTRIC WELDING.

1,407,900.    Specification of Letters Patent.    Patented Feb. 28, 1922.

Application filed July 17, 1920. Serial No. 396,881.

*To all whom it may concern:*

Be it known that I, RICHARD STRESAU, a citizen of the United States, and a resident of the city of Wauwatosa, in the county of Milwaukee and State of Wisconsin, have invented a certain new and useful Improvement in Apparatus for Electric Welding, (Case #152;) and I do declare the following to be a clear, exact, and complete description thereof, such as will enable persons skilled in the art to which the invention pertains to make and use the same, reference being had to the accompanying drawings for an illustration of one form of construction in which my invention has been embodied.

The invention relates to electric arc welding.

My invention resides in the provision of means for automatically establishing the welding arc at the commencement of the welding operation, and for maintaining the intensity of such arc during the continuance of that operation.

In my improved construction, the welding current is transmitted through a solenoid, to the core of which a fusible electrode is directly connected. The excitation of the solenoid will actuate the core, and withdraw the electrode from its position of initial contact with the work to be welded, which latter is in the circuit, so that an arc is sprung between the point of the electrode and the work. With the establishment of the arc, the movement of the work past the welding point of the electrode is commenced, and the arc creates a welding temperature in the work in a zone extending along the welding line. At the same time, the electrode is fused and the molten metal flowing therefrom is incorporated in the joint to complete the welding operation.

The end of the core of the solenoid is bored for the reception of the end of the fusible electrode. The direct connection thus established between the parts enables me to very materially simplify the construction, and effects the elimination of the complicated structures heretofore employed, in which it has been attempted to utilize the welding current as a means to energize a magnetic coil to withdraw the point of a fusible electrode from its contact with the work to be welded and thus strike a welding arc.

In the present construction, the fusible electrode is supported in a relatively fixed position while the arc is flowing, but the fusing point thereof recedes as the welding progresses. It is therefore necessary to provide some means whereby the work to be welded will follow the receding point of the fusing electrode at a corresponding rate of travel, in order that the length of the arc may be maintained without substantial variation during the welding operation.

To achieve this result, I mount the work to be welded in a cradle or carriage which travels in a path which is inclined with reference to the longitudinal line of the electrode, and which supports the work in a horizontal position, with the result that the electrode stands normal with respect to the welding line. Actuating means for moving the work past the welding point of the electrode during the consumption of the latter have been provided.

The novel features of my invention will be pointed out in the appended claims.

The accompanying drawing shows in elevation one form of construction of apparatus embodying my present invention.

Referring to the drawing, 10 and 11 indicate the side members of a part of the frame of the apparatus. The said members 10 and 11 are inclined, as shown, and are provided on their separated inside surfaces with parallel channels 12 and 13. Brackets 15 depend from the said parts 10 and 11, and journaled in the said brackets is a shaft 16, provided with a crank 17. Fixed upon the shaft 16 is a pinion 18 in engagement with a rack 19. The rack 19 is attached to feet 20 and 21, upon the underside of a cradle or carrier 22, which latter supports the work to be welded, in the present instance a tubular section 23. The cradle or carrier is provided with properly located supporting and guiding rollers 24 and 25, which move in the channels 12 and 13 in the inclined side bars 10 and 11, the latter being separated so as to permit the movement of the cradle or carrier between them. It follows from the arrangement shown and described, that the upper surface of the tubular section 23, will maintain a relatively horizontal position, notwithstanding the fact that the rollers 24 and 25 and the carrier 22 have a movement in an inclined path.

A standard 26 rises from the side bar 10 and supports at its upper end a solenoid 27, which is provided with a core 28. The projecting lower end of the said core 28 is bored to receive the bare end of the electrode 29, such bare end of the electrode being clamped in the said bore by any convenient means, whereby the electrode is directly connected to the core of the solenoid. Projecting from the upper end of the core 28, is a guiding rod 30, upon which is set a collar 31, which may be adjusted so as to provide a stop for the downward movement of the core and the electrode which it supports, during the time that the core is free from the influence of the solenoid. A circumferential flange or stop 32 is arranged about the projecting lower end of the core 28, and is adapted to bear against stop pins 23 fixed in the standard 26, and thus limit the movement of the core within the solenoid when the latter is energized. The range of axial movement of the electrode is limited by the location of the adjustable collar 31 on the rod 30, and the stop 32 on the core of the solenoid. By means of the provisions for adjustment described, the length of the arc to be maintained during the welding operation, may be determined.

The solenoid 27 is within the welding circuit, the current thereof being conducted through the connection 34. The current is transmitted through the connection 35 leading from the solenoid to the head of the core and thence to the electrode. The current returns by way of the conductor 36, which latter is in circuit with the tubular section 23, constituting the work to be welded.

In the operation of my device, the carriage or cradle 22 is run to its lower level, and the tubular section to be welded is clamped therein. In such position of the parts, the point of the electrode is in contact with the tubular section at the left hand end thereof. The switch being closed, the welding current will flow through the solenoid and energize the latter, the magnetic attraction thus created pulling upon the core 28 until the flange 32 contacts with the stop pins 33. This movement of the core 28 and the electrode 29, withdraws the point of the electrode from contact with the work to be welded, by means of the direct connection of the parts and establishes a welding arc between the point of the electrode and the work. Rotation of the crank 17 in the direction indicated by the arrow, will cause the cradle or carrier 22, to move along the inclined track and progressively move the tubular section 23 past the point of the fusing electrode. The movement of the work is equalized with respect to the rate of the fusion of the electrode, so that the welding is advanced in the same degree that the electrode is consumed. While the welding line is following the receding point of the fusing electrode, the arc is maintained, in a substantially constant degree, so that the edges of the tubular section 23 are brought to a welding temperature, and the electrode 29 is fused, the molten metal flowing therefrom being incorporated with the fused edges of the work to make a completely welded joint. With the completion of the welding operation, this occuring when in the relative movement of the parts, the point of the electrode has reached the right hand end of the tubular section 23, the switch will be thrown to break the circuit. The movement of the crank 17 will then be reversed and the carriage run to its lower position, to permit the removal of the section just welded and the insertion of another in the carriage. A fresh electrode having been supplied, the operation described will be repeated.

The direct connection of the electrode to the core of the solenoid, whereby these parts occupy a relative fixed position and move as one, enables me to embody the invention in a simple structure and eliminate the complicated mechanisms heretofore employed for achieving like results.

Changes in the structural embodiment of the invention may be made without departing from the scope of the invention. For example, the work may move in a parallel plane, and the solenoid may be mounted so as to have a movement to feed the electrode as the welding line is traversed. Or, the work may be held in a stationary position, and the solenoid made to travel in a diagonal path with respect thereto, to move the fusing point of the electrode along the line of the weld.

Having thus described my invention, what I claim and desire to secure by Letters Patent of the United States, is:

1. In an electric welding apparatus, a fusible electrode, a solenoid the core of which is bored to receive one end of the said electrode, whereby the said core and the electrode are directly connected, and means for conducting a welding current to excite the solenoid to withdraw the electrode from contact with the work, to establish a welding arc.

2. In an electric welding apparatus, a fusible electrode mounted to have a retractive movement to establish a welding arc, a solenoid to the core of which the electrode is directly connected, and means for conducting a welding current to excite the solenoid to move the electrode.

3. In an electric welding apparatus, a fusible electrode mounted to have a retractive movement to establish a welding arc, a solenoid to the core of which the electrode is directly connected, means for conducting a welding current to excite the solenoid to move the electrode, and means to limit the action of the solenoid and determine the length of the arc.

4. In an electric welding apparatus, a support for the work to be welded, a welding circuit embracing a solenoid, a fusible electrode directly attached to the core thereof and adapted to be brought into contact with the work, whereby the excitation of the solenoid will retract the electrode to establish a welding arc between the electrode and the work, and means for moving the work past the fusing point of the electrode.

5. In an electric welding apparatus, a solenoid, a fusible electrode directly connected to the core of the solenoid, means for conducting a welding current through the solenoid to retract the electrode and establish a welding arc, and means for moving the work past the point of the electrode in the ratio of the fusion of the latter.

6. In an electric welding apparatus, a stationary solenoid, a fusible electrode directly connected to the core of the solenoid, means for conducting a welding current through the solenoid to retract the electrode and establish a welding arc, and means for moving the work past the point of the electrode in the ratio of the fusion of the latter.

7. In an electric welding apparatus, a stationary solenoid, a fusible electrode directly connected to the core of the solenoid, means for conducting a welding current to the solenoid to energize the latter to retract the electrode and establish a welding arc, means to determine the length of and sustain the arc thus formed, and means for moving the work past the point of the fusing electrode.

8. In an electric welding apparatus, a fusible metallic electrode and a solenoid, both comprised in the welding circuit, the said electrode being directly connected to the core of the solenoid, whereby the point of the electrode is withdrawn from the contact with the work to strike a welding arc when the solenoid is energized by the welding circuit.

In testimony whereof, I have signed my name at Milwaukee, this 14″ day of July, 1920.

R. STRESAU.

Witnesses:
W. F. WOOLARD,
C. THEO. OSTERBERG.